Patented Apr. 21, 1931

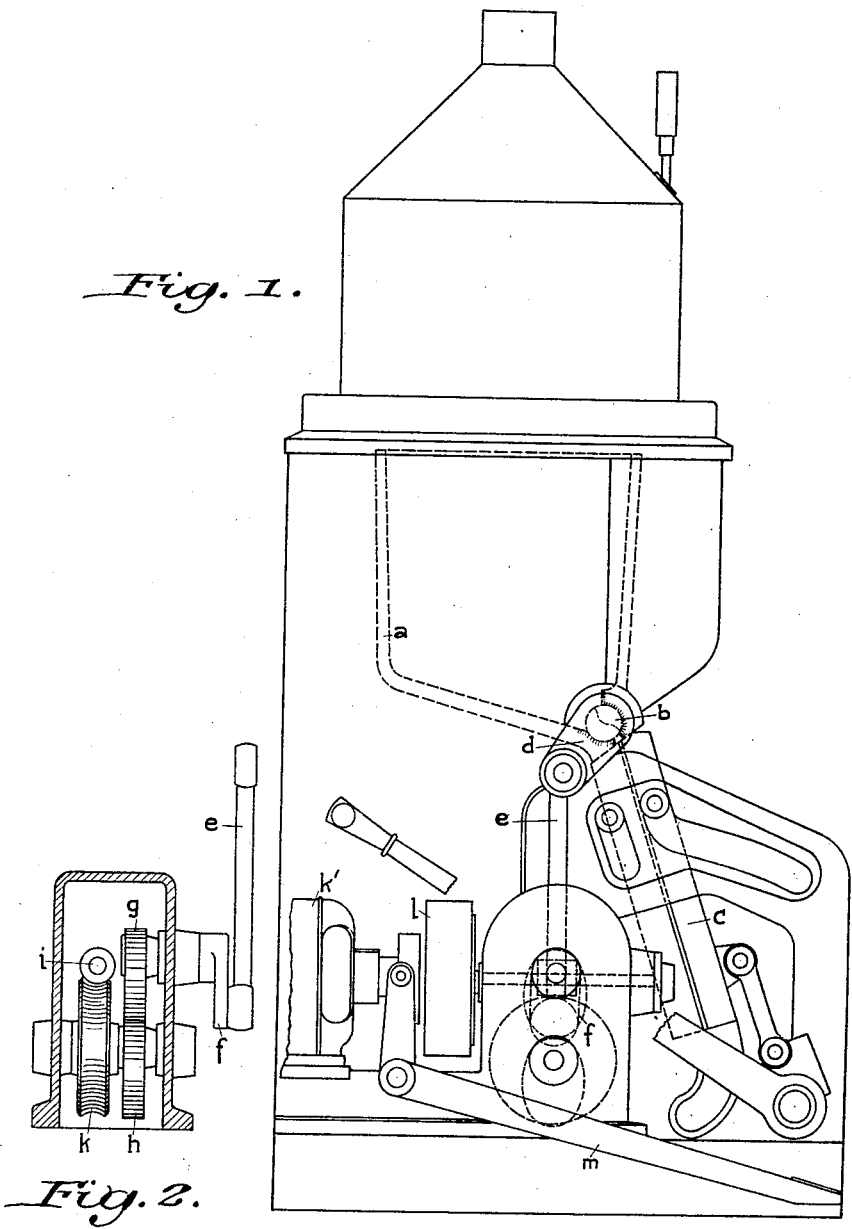

1,802,300

UNITED STATES PATENT OFFICE

CARL WINKLER, OF BERN, SWITZERLAND, ASSIGNOR TO "WINKLOR" MATERN & STEREO A. G., OF GLARUS, SWITZERLAND, A CORPORATION OF SWITZERLAND

MACHINE FOR CASTING STEREOPLATES

Application filed December 28, 1929, Serial No. 417,174, and in Germany December 29, 1928.

In machines for casting stereotype plates in which the mold or box is pressed tightly against the melting pot, and a valve is used to regulate the flow of molten metal into the mold, better plates are obtained when the mold is filled very quickly. But, in practice, it has been found that the surface of certain matrices are injured by the sudden flow of metal, so that it is sometimes preferable to open the valve slowly. This is particularly the case in casting flat stereo-plates, because the nearly vertical fall of the metal into such molds is a great strain on the surface of the matrix.

In order to overcome this drawback the invention provides for moving the valve with varying speed so that the opening between the pot and mold is uncovered slowly while the previous motion takes place quickly as long as the valve overlaps the outlet opening.

On the drawing the invention is shown by way of example.

Fig. 1 is a side elevation of a machine for casting stereo-plates.

Fig. 2 is a section through the driving mechanism.

In the wall of the pot $a$ is provided the valve $b$ which makes and cuts off the connection between the pot $a$ and mold $c$. For the purpose of turning the valve a crank $d$ is used which, by means of a connecting rod $e$, is moved by a second crank $f$. The latter is fixed on the shaft of an elliptical toothed wheel $g$ which engages in a second elliptical toothed wheel $h$ seated on the shaft of a worm-wheel $k$ adapted to be driven by a worm $i$. The worm $i$ is driven by the motor $k'$ through the agency of the clutch $l$, which is actuated by a foot-pedal $m$. As soon as the valve is properly opened the clutch $l$ is released in known manner, and the drive discontinues.

For opening and closing the valve the crank $d$ turns through about 90° each time. The opening motion takes place quickly, as long as the valve overlaps the opening, but becomes slower, owing to the action of the elliptical toothed wheels, so that the opening in the wall of the pot is slowly uncovered. In closing the valve begins to move slowly—which is of advantage to cut off the plate from the metal in the throat between pot and mold—and then accelerates when the valve overlaps the opening, so that the total time of opening is not increased.

What I claim and desire to secure by Letters Patent of the United States is:

1. In a machine for casting stereo-plates the combination of a melting pot with an outlet opening in its wall, a valve adapted to open and close the opening of said pot, a mold adapted to be brought into register with the opening in said pot, and means to move said valve at high speed while the valve body overlaps the opening and at a slower speed to uncover the outlet opening.

2. In a machine for casting stereo-plates the combination of a melting pot having an outlet opening in its wall, a valve adapted to open and close said opening and elliptical toothed wheels adapted to move said valve at high speed while the valve body overlaps the opening and at a slower speed to uncover the outlet opening.

In testimony whereof I have signed my name to this specification.

CARL WINKLER.